US008890363B2

United States Patent
Aiello et al.

(10) Patent No.: US 8,890,363 B2
(45) Date of Patent: Nov. 18, 2014

(54) AUTOMATIC SYSTEM FOR SYNCHRONOUS ENABLEMENT-DISABLEMENT OF SOLAR PHOTOVOLTAIC PANELS OF AN ENERGY PRODUCTION PLANT WITH DISTRIBUTED DC/DC CONVERSION

(75) Inventors: Natale Aiello, Trecastagni (IT); Francesco Giovanni Gennaro, Catania (IT); Giuseppe Scuderi, Catania (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 641 days.

(21) Appl. No.: 13/240,382

(22) Filed: Sep. 22, 2011

(65) Prior Publication Data
US 2012/0091810 A1  Apr. 19, 2012

(30) Foreign Application Priority Data
Sep. 29, 2010  (IT) .............................. VA2010A0072

(51) Int. Cl.
*H02J 1/00* (2006.01)
*H02J 1/10* (2006.01)
*H02J 3/38* (2006.01)

(52) U.S. Cl.
CPC ............... *H02J 1/102* (2013.01); *Y02E 10/563* (2013.01); *H02J 3/383* (2013.01)
USPC .......................................................... 307/82

(58) Field of Classification Search
USPC .......................................................... 307/82
See application file for complete search history.

(56) References Cited

U.S. PATENT DOCUMENTS

| 2008/0164766 | A1* | 7/2008 | Adest et al. ...................... 307/80 |
| 2010/0013317 | A1* | 1/2010 | Ballantine et al. ............... 307/82 |
| 2010/0133911 | A1 | 6/2010 | Williams et al. ................. 307/82 |
| 2012/0043923 | A1* | 2/2012 | Ikriannikov et al. .......... 320/103 |

FOREIGN PATENT DOCUMENTS

DE  10136147  2/2003 ................ H02J 1/10

OTHER PUBLICATIONS

Natale Aiello, "Photovoltaic Panel Power Generation Plant With Distributed Conversion", Mar. 15, 2010, pp. 1-39.
Natale Aiello, "Automatic Disabling of Photovoltaic Panels in Case of Fire or of Other Escrructive Event", Mar. 15, 2010, pp. 1-31.

* cited by examiner

*Primary Examiner* — Daniel Cavallari
(74) *Attorney, Agent, or Firm* — Allen, Dyer, Doppelt, Milbrath & Gilchrist, P.A.

(57) ABSTRACT

A solar energy plant may include a DC bus, photovoltaic panels coupled in parallel to the DC bus, each photovoltaic panel having a DC/DC converter, and a first controller controlling the DC/DC converter depending on whether a voltage on the DC bus is equal to or greater than a first threshold and lower than or equal to a second threshold. The solar energy plant may include a DC/AC inverter coupled to the DC bus and outputting an output AC voltage, an auxiliary start-up power supply charging a parasitic capacitance on the DC bus up to the first threshold, and a second controller turning on the auxiliary start-up power supply based upon a start command, and turning off the auxiliary start-up power supply and simultaneously turning on the DC/AC inverter.

26 Claims, 3 Drawing Sheets

AUTOMATIC SYSTEM FOR SYNCHRONOUS ENABLEMENT-DISABLEMENT OF SOLAR PHOTOVOLTAIC PANELS OF AN ENERGY PRODUCTION PLANT WITH DISTRIBUTED DC/DC CONVERSION

FIELD OF THE INVENTION

The present disclosure relates to photovoltaic energy conversion systems for solar sources and that employ multi-cell panels.

BACKGROUND OF THE INVENTION

Besides typical photovoltaic solar systems using panels and direct current-alternating current (DC-AC) conversion units either centralized or associated to strings of panels, there is an ongoing development of systems of photovoltaic energy conversion systems that implement a distributed type of DC/DC conversion with an embedded common Maximum Power Point Tracking algorithm (MPPT) function, instead of being centralized at the input of the DC/AC conversion inverter.

Italian patent applications Nos. VA2010A000024 and VA2010A000025, both filed on Mar. 15, 2010, assigned to the present application's assignee, the contents of each hereby incorporated by reference in their entirety, disclose a photovoltaic panel generating plant implementing a distributed DC/DC conversion. These disclosures also highlight the ease with which other functions may be implemented, such as the placing of the whole plant in a safe condition whenever the main DC/AC inverter connection to the public main is switched off (either deliberately by the photovoltaic plant operator or automatically by the public main operator because of an intervening need of isolating the photovoltaic energy producing plant from the public main).

In these systems, each photovoltaic panel or module is directly connected to a DC input bus of a DC/AC inverter through an on-board electronic DC/DC converter, preferably with MPPT control, that is normally embedded in a suitably sized weatherproof junction box at the panel. This may realize a plant network having a single central node and several secondary nodes, as illustrated schematically in FIG. 1.

As described in the above-noted prior patent applications, implementation of important ancillary functions, such as, for example, monitoring the operating conditions of each single panel, disabling of single panels or of all panels (e.g., in case the so-called "anti-islanding" protection system switches off the main inverter or in case of the intervention of fire fighters) to eliminate the risk of electrocution, may require communication between the central or main inverter and the panels and therefore a dedicated communication bus, transceivers, and/or specific software for monitoring and actuating appropriate isolation switches. The so-called "photovoltaic field" may require deployment of specific additional electronic modules for managing a data transfer protocol, such as, for example, Power Line Modem (PLM) or equivalent devices as well as complex software in terms of computation, complexity, considering the eventuality of managing networks that may includes thousands of nodes.

SUMMARY OF THE INVENTION

A robust, low cost, and reliable approach has been found to the problem of providing for an automatic synchronous enablement of all the photovoltaic panels of generation plants with distributed DC/DC conversion when suitable turn-on conditions of the main inverter of DC/AC conversion of the plant are verified upon starting up the energy production plant, and of synchronous disablement of all photovoltaic panels upon the turning-off of the main inverter of DC/AC conversion, without requiring implementation of any dedicated communication channel between the main inverter and the single photovoltaic panels, i.e. specific circuitry for communication, data processing and actuation, associated to the DC/DC converter on-board of each single panel.

Switching-off the main inverter may be dictated by needs of intervening at the plant or automatically actuated in response to the recognition of anomalous and potentially dangerous conditions, such as, for example, those detected by a conventional anti-islanding protection system, by fire sensors, or because of malfunctioning of the main inverter. Basically, a photovoltaic panel generation plant of electrical energy from a solar source with automatic synchronous enabling/disabling of the photovoltaic panels of the present disclosure may comprise any number of photovoltaic panels connected in parallel to a common DC bus. Each panel incorporates an on-board DC/DC converter, preferably with embedded MPPT control, and a microcontroller for monitoring the voltage present on the output terminals of the converter (i.e. on the electrical connection terminals of the panel to the DC bus) and eventually for turning on or off the converter, depending on whether the voltage on the DC bus common to all panels is equal to or greater than a first threshold value or exceeding a maximum limit value.

The inverter of DC/AC conversion may be normally controlled by a microcontroller adapted to monitor, among other parameters, the input DC voltage, may have its input connected to the DC bus common to all the panels, and may output an AC voltage of amplitude regulated within a standard variable range and standard frequency of the public main. An auxiliary power supply for the start-up of the plant may be associated to or integrated together with the inverter circuit. The auxiliary power may be turned on at the start command of the generation plant and its function is to charge the parasitic capacitance associated to the common DC bus connected to the input of the main inverter, up to and eventually surpassing the first threshold voltage. The auxiliary power may be turned off by the microcontroller upon verifying the rising of the voltage on the input DC bus beyond the first threshold voltage and up to a threshold of the regulation design range of the DC input voltage to the main inverter, at which event the microcontroller also turns on the main inverter circuit of DC/AC conversion.

During normal operation of the photovoltaic panel solar generation plant that contemplates the turning off of the main inverter of DC/AC conversion, as a safety measure implemented in an automatic manner by the anti-islanding monitoring system or deliberately because of needs of the operator of the public electric distribution network or of the operator of the solar generation plant to intervene on the plant, the photovoltaic panel solar generation plant may actuate an electrically disconnection (galvanic isolation) of the plant from the public electrical distribution main and from the local electrical load circuit. However, such a safety measure of typical photovoltaic panel systems may leave unaddressed the risk of electrocution represented by the presence of high voltage power on the DC input side (i.e., in the so-called photovoltaic field) if the panels are illuminated.

According to the system of the present disclosure, whenever the main inverter is switched off, on the common DC bus connected to the input of the inverter, which is thus placed in a state of high impedance, may occur an abrupt increase of the voltage that exceeds a maximum limit threshold (e.g., set equal to or slightly higher of the upper limit value of the range of regulation of the DC input voltage to the inverter). This situation may be detected by the microcontrollers of the DC/DC converters on-board of all the panels and may cause the automatic synchronous turning off of all the DC/DC converters on-board of the panels that are brought to a stand-by state from which they may not able to resume. This is because the parasitic capacitance of the DC bus may be discharged, thus eliminating any risk of electrocution throughout the photovoltaic field.

A fresh start command of the generation plant may determine the execution of a new start-up phase with the turning on of the auxiliary power supply that charges the parasitic capacitance of the DC bus for bringing the voltage thereon up to the set threshold of synchronous turning on of the DC/DC converters on-board of all panels of the photovoltaic field. This may eventually lead to the turning on the main inverter circuit of DC/AC conversion and simultaneous turning off of the auxiliary start-up power supply.

The stated objectives may be met without the need of implementing monitoring/communication channels between each panel and the main inverter station, thus reliably and safely resolving the problem of placing the whole plant in a safe state whenever necessary.

DETAILED DESCRIPTION OF THE PREFERRED EMBODIMENTS

Figure 1:
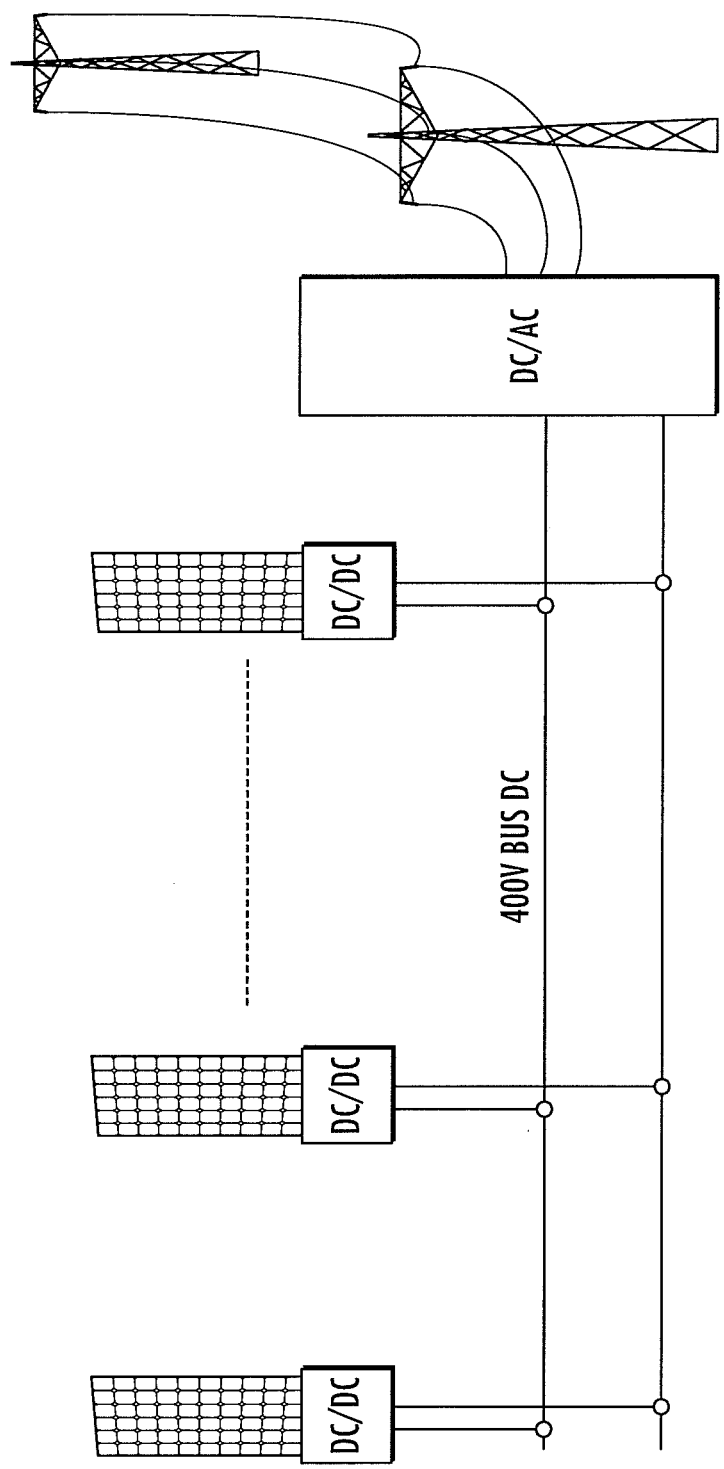
FIG. 1 is a schematic diagram of a photovoltaic panel generation plant, according to the prior art.
Figure 2:
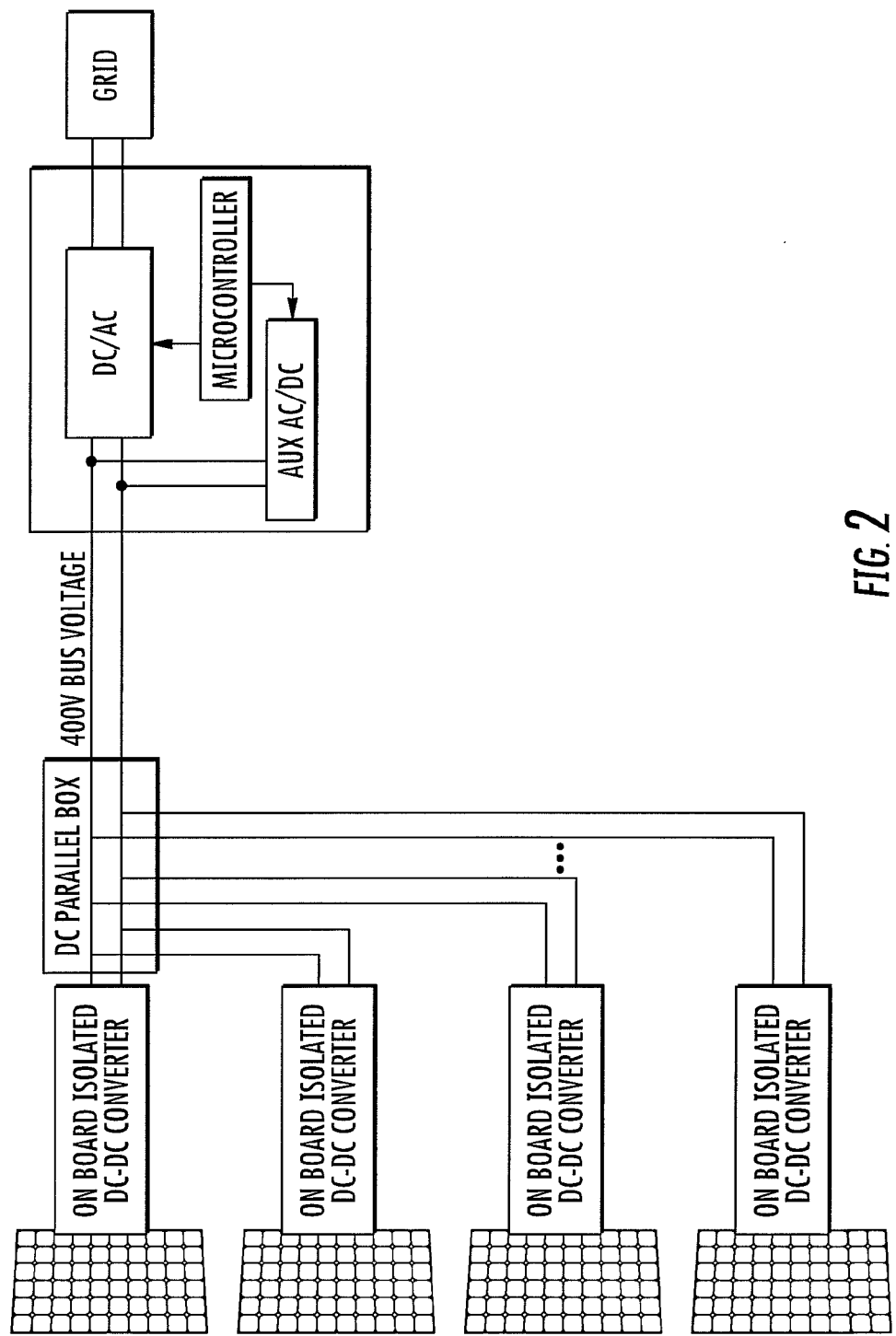
FIG. 2 is a schematic diagram of a photovoltaic panel generation plant with distributed DC/DC conversion with synchronous enablement/disablement of all the panels, according to the present invention.

FIG. 2 shows a basic diagram of a photovoltaic plant using panels with DC/DC conversion implemented on-board of each panel, wherein all panels have output terminals coupled to the on-board DC/DC converter and are connected in parallel to a common DC bus. As indicated by a block associated to each panel, which represents a circuit module containing the circuit of the DC/DC converter installed in a properly sized weatherproof junction box of the panel, the converter circuit may preferably have a transformer architecture to ensure galvanic isolation between a primary circuit connected to one or more strings of photovoltaic cells in series of the panel.

The converter circuit also comprises a dedicated circuit or device that implements a MPPT algorithm, which maximizes the delivered power at the instantaneous conditions of irradiation of the photovoltaic cells or more commonly of strings of cells in series of the panel and of the load conditions, by increasing or decreasing the output voltage of the DC/DC converter, which may have any boost (step-up) or boost-buck (step-up/step-down) architecture, preferably providing for galvanic isolation. All panels (i.e., the output terminals of the DC/DC inverter on-board) are connected in parallel to a common DC bus, which in the considered example may be a bus of (nominally) 400 VDC. This is stated considering that the MPPT optimization that is actuated at the level of each individual panel (through the on-board DC/DC converter) may regulate the VDC voltage that is eventually input to the main inverter of DC/AC conversion, in a way to maximize the power absorbed from the photovoltaic conversion plant, i.e. from the illuminated panels.

The range of regulation of the DC/DC converters on-board of the single panels may be from about 100-150 VDC up to about 350-900 VDC, depending on the input circuit configuration (mono-phase or three-phase, half bridge or full bridge) of the main inverter that constructs the output AC sinusoid at standard main frequency and with an amplitude adapted to maximize the instantaneous power absorbed by the public mains. This is to be compatible with the standard variable range of the main voltage.

As schematically shown in FIG. 2, the circuit block of the main inverter of DC/AC conversion of the plant comprises, besides the conversion circuitry, a microcontroller and ancillary circuits for monitoring, controlling and protecting itself from overloads, over-temperatures and over-voltages according to typical configurations and topologies. The DC/AC conversion of the plant comprises an auxiliary power supply AUX AC/DC, which in case of generation plants connected to the public electrical distribution network GRID may be a Switching Mode Power Supply (SMPS) buffered by a battery or other substitutive electrical source. The auxiliary power supply AUX AC/DC may be controlled by the same microcontroller of the main inverter MICROCONTROLLER to perform a start-up phase at every start command of the plant.

Upon receiving a start command from the plant, the microcontroller turns on the auxiliary power supply AUX AC/DC, which charges the parasitic capacitance of the DC bus, raising the voltage to the first threshold T1. Upon reaching the first threshold which the microcontrollers of the DC/DC converters detect on the output terminals of the panel as a voltage equal to or greater than the wake-up threshold T1, the microcontrollers turn on the respective converter circuits. Upon turning on, the DC/DC converters on-board of each panel contribute to raise the voltage on the DC bus that rapidly reaches and eventually surpasses the second threshold T2 of the range of regulation of the DC voltage input to the main inverter (e.g., set at about 350-400 VDC), thus the microcontroller of the main inverter may now detect conditions adapted to the turning-on of the inverter circuit and it does so, simultaneously turning off the auxiliary power supply AUX AC/DC, thus ending the start-up phase.

Figure 3:
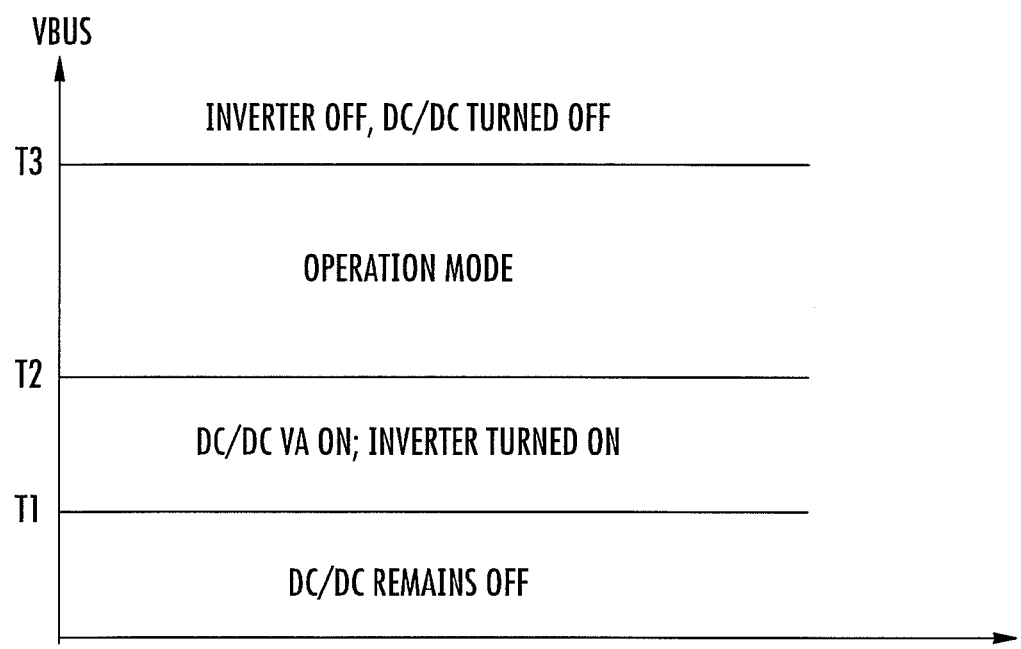
FIG. 3 is a diagram of the three DC voltage thresholds, the reaching/surpassing of which is detected by the microcontroller associated to the functional circuit of the DC/DC converter on-board of each panel, according to the present invention.

During operation of the plant, the automatic synchronous enabling/disabling system of the photovoltaic panels of the present disclosure may ensure automatic reliable protection even in case of destructive events, such as fires, severing of cables, etc., by placing the photovoltaic field in a low risk condition for fire fighters or other personal to enter it. Should, during normal operation of the plant, it become necessary to isolate it from the public mains, for example, because of fire or other dangerous situations, by simply switching off the main inverter manually or by action of the anti-islanding system or fire sensors, a safety disablement of all the panels may be actuated notwithstanding the fact that they may be exposed to sunlight. FIG. 3 shows in a diagram the three voltage thresholds, the reaching or surpassing of which is monitored by the microcontroller associated to the functional circuit of the DC/DC converter on-board each panel and on the main inverter.

That which is claimed is:

1. A solar energy plant comprising:
    a direct current (DC) bus;
    a plurality of photovoltaic panels coupled in parallel to said DC bus, each photovoltaic panel having a DC/DC converter, and a first controller configured to enable and disable said DC/DC converter depending on whether a voltage on said DC bus is equal to or greater than a first threshold and lower than or equal to a second threshold;
a DC/alternating current (AC) inverter configured to be coupled to said DC bus and to output an output AC voltage;
an auxiliary start-up power supply configured to charge a parasitic capacitance on said DC bus up to the first threshold; and
a second controller configured to turn on said auxiliary start-up power supply based upon a start command, and to turn off said auxiliary start-up power supply and simultaneously turn on said DC/AC inverter when the voltage on said DC bus reaches a third threshold in an input voltage operating range of said DC/AC inverter.

2. The solar energy plant according to claim 1 wherein said respective first controllers and said second controller cooperate to provide synchronous enablement-disablement of said plurality of photovoltaic panels.

3. The solar energy plant according to claim 1 wherein said DC/AC inverter is coupled to a public electric distribution network; and wherein said auxiliary start-up power supply is powered by the public electric distribution network.

4. The solar energy plant according to claim 1 wherein the second threshold is equal to or greater than an upper limit voltage of the input voltage operating range of said DC/AC inverter.

5. The solar energy plant according to claim 4 wherein said auxiliary start-up power supply comprises a switched mode power supply (SMPS) type.

6. The solar energy plant according to claim 1 wherein the second threshold comprises a maximum limit threshold.

7. The solar energy plant according to claim 1 wherein said DC bus comprises a common DC bus.

8. The solar energy plant according to claim 1 wherein said DC/DC converter comprises an on-board DC-DC converter integrated in the respective photovoltaic panel.

9. The solar energy plant according to claim 1 wherein said DC-AC inverter is configured to provide the output AC voltage at a set amplitude and frequency based a public electric distribution network.

10. A solar energy plant comprising:
a direct current (DC) bus;
a plurality of photovoltaic panels coupled in parallel to said DC bus, each photovoltaic panel having a DC/DC converter, and a first controller configured to enable and disable said DC/DC converter depending on whether a voltage on said DC bus is equal to or greater than a first threshold and lower than or equal to a second threshold;
a DC/alternating current (AC) inverter configured to be coupled to said DC bus and to output an output AC voltage to a public electric distribution network;
an auxiliary start-up power supply configured to be powered by the public electric distribution network and to charge a parasitic capacitance on said DC bus up to the first threshold; and
a second controller configured to turn on said auxiliary start-up power supply based upon a start command, and to turn off said auxiliary start-up power supply and simultaneously turn on said DC/AC inverter when the voltage on said DC bus reaches a third threshold in an input voltage operating range of said DC/AC inverter, thereby providing synchronous enablement-disablement of said plurality of photovoltaic panels.

11. The solar energy plant according to claim 10 wherein the second threshold is equal to or greater than an upper limit voltage of the input voltage operating range of said DC/AC inverter.

12. The solar energy plant according to claim 10 wherein said auxiliary start-up power supply comprises a switched mode power supply (SMPS) type.

13. The solar energy plant according to claim 10 wherein the second threshold comprises a maximum limit threshold.

14. A device for operating a solar energy plant comprising:
a first controller associated with a respective photovoltaic panel from a plurality thereof and configured to enable and disable a direct current (DC)/DC converter associated with the respective photovoltaic panel depending on whether a voltage on a DC bus coupled to plurality of photovoltaic panels is equal to or greater than a first threshold and lower than or equal to a second threshold;
a DC/alternating current (AC) inverter configured to be coupled to the DC bus and to output an output AC voltage;
an auxiliary start-up power supply configured to charge a parasitic capacitance on the DC bus up to the first threshold; and
a second controller configured to turn on said auxiliary start-up power supply based upon a start command, and to turn off said auxiliary start-up power supply and simultaneously turn on said DC/AC inverter when the voltage on the DC bus reaches a third threshold in an input voltage operating range of said DC/AC inverter.

15. The device according to claim 14 wherein said first controller and said second controller cooperate to provide synchronous enablement-disablement of the plurality of photovoltaic panels.

16. The device according to claim 14 wherein said DC/AC inverter is coupled to a public electric distribution network; and wherein said auxiliary start-up power supply is powered by the public electric distribution network.

17. The device according to claim 14 wherein the second threshold is equal to or greater than an upper limit voltage of the input voltage operating range of said DC/AC inverter.

18. The device according to claim 17 wherein said auxiliary start-up power supply comprises a switched mode power supply (SMPS) type.

19. The device according to claim 14 wherein the second threshold comprises a maximum limit threshold.

20. A method of synchronously enabling and disabling a plurality of photovoltaic panels coupled in parallel to a direct current (DC) bus of a solar energy plant, each photovoltaic panel including an DC/DC converter, and a first controller for turning on and off the DC/DC converter, the DC bus coupled to an input of a main DC/alternating current (AC) inverter controlled by a second controller, the method comprising:
fixing a first voltage threshold for wake-up of the plurality of photovoltaic panels, and a second voltage threshold, and a third voltage threshold in an input voltage operating range of the DC/AC inverter;
monitoring a voltage present on the DC bus using the first controller in each photovoltaic panel, and enabling/disabling the respective DC/DC converter depending on whether the voltage on the DC bus is equal to or greater than the first voltage threshold and lesser than or equal to the second voltage threshold; and
at every start command of the solar energy plant, charging a parasitic capacitance on the DC bus with an auxiliary power supply turned on by the second controller and turned off upon the voltage on the DC bus exceeding third voltage threshold while simultaneously turning on the DC/AC inverter.

21. The method according to claim 20 wherein the second voltage threshold is equal to or greater than an upper limit voltage of the input voltage operating range of said DC/AC inverter.

22. The method according to claim 20 wherein the DC/AC inverter is coupled to a public electric distribution network; and wherein the auxiliary start-up power supply is powered by the public electric distribution network.

23. The method according to claim 20 wherein the second voltage threshold comprises a maximum voltage limit threshold.

24. A method of making a solar energy plant comprising:
coupling a plurality of photovoltaic panels in parallel to a direct current (DC) bus, each photovoltaic panel having a DC/DC converter, and a first controller enabling and disabling the respective DC/DC converter depending on whether a voltage on the DC bus is equal to or greater than a first threshold and lower than or equal to a second threshold;
coupling a DC/alternating current (AC) inverter to the DC bus and to output an output AC voltage;
coupling an auxiliary start-up power supply to charge a parasitic capacitance on the DC bus up to the first threshold; and
coupling a second controller to turn on the auxiliary start-up power supply based upon a start command, and to turn off the auxiliary start-up power supply and simultaneously turn on the DC/AC inverter when the voltage on the DC bus reaches a third threshold in an input voltage operating range of the DC/AC inverter.

25. The method according to claim 24 wherein the respective first controllers and the second controller cooperate to provide synchronous enablement-disablement of the plurality of photovoltaic panels.

26. The method according to claim 24 further comprising coupling the DC/AC inverter to be coupled to a public electric distribution network; and coupling the auxiliary start-up power supply to be powered by the public electric distribution network.

* * * * *

UNITED STATES PATENT AND TRADEMARK OFFICE
CERTIFICATE OF CORRECTION

| | | |
|---|---|---|
| PATENT NO. | : 8,890,363 B2 | Page 1 of 1 |
| APPLICATION NO. | : 13/240382 | |
| DATED | : November 18, 2014 | |
| INVENTOR(S) | : Aiello et al. | |

It is certified that error appears in the above-identified patent and that said Letters Patent is hereby corrected as shown below:

In the Claims

Column 5, Line 42     Delete: "based a"
                                    Insert: --based on a--

Signed and Sealed this
Twenty-eighth Day of July, 2015

Michelle K. Lee
*Director of the United States Patent and Trademark Office*